(12) United States Patent
Streib et al.

(10) Patent No.: US 7,774,124 B2
(45) Date of Patent: Aug. 10, 2010

(54) METHOD FOR DETERMINING THE COMPOSITION OF A FUEL BLEND

(75) Inventors: Martin Streib, Vaihingen (DE); Nikolas Poertner, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 154 days.

(21) Appl. No.: 12/203,642

(22) Filed: Sep. 3, 2008

(65) Prior Publication Data

US 2009/0063005 A1    Mar. 5, 2009

(30) Foreign Application Priority Data

Sep. 5, 2007    (DE) .................. 10 2007 042 229

(51) Int. Cl.
*F02D 41/00* (2006.01)
*F02D 45/00* (2006.01)

(52) U.S. Cl. .................. 701/101; 701/103; 123/406.24

(58) Field of Classification Search .................. 701/101, 701/103; 123/304, 406.23, 406.24; 702/50
See application file for complete search history.

(56) References Cited

U.S. PATENT DOCUMENTS

| | | | | |
|---|---|---|---|---|
| 5,832,897 | A * | 11/1998 | Zhang | 123/406.23 |
| 5,992,385 | A * | 11/1999 | Hess et al. | 123/406.23 |
| 6,161,523 | A * | 12/2000 | Unland et al. | 123/406.23 |
| 2005/0115542 | A1 * | 6/2005 | Hochstrasser et al. | 123/406.23 |
| 2008/0289401 | A1 * | 11/2008 | Boerkel | 123/1 A |
| 2009/0024303 | A1 * | 1/2009 | Schneider et al. | 701/103 |
| 2009/0070017 | A1 * | 3/2009 | Joos et al. | 701/111 |
| 2009/0229588 | A1 * | 9/2009 | Mallegbrein et al. | 701/109 |
| 2010/0017097 | A1 * | 1/2010 | Bidner et al. | 701/103 |

FOREIGN PATENT DOCUMENTS

| | | |
|---|---|---|
| DE | 29 52 073 | 6/1981 |
| DE | 30 36 107 | 5/1982 |
| DE | 38 33 123 | 4/1989 |
| DE | 41 17 440 | 12/1991 |

* cited by examiner

*Primary Examiner*—John T Kwon
*Assistant Examiner*—Arnold Castro
(74) *Attorney, Agent, or Firm*—Merchant & Gould P.C.

(57) ABSTRACT

The invention relates to a method for determining the composition of a fuel blend from a first and at least a second fuel to operate an internal combustion engine with at least one combustion chamber, wherein fuel blends of different composition combust at different optimal ignition angles $ZW_{max}$ with an optimal degree of efficiency $\eta_{max}$. Provision is thereby made for the ignition angle ZW of the internal combustion engine to be altered, for the degree of efficiency $\eta$ of the internal combustion engine or a parameter, which is a function of it, to be determined as a function of the ignition angle ZW and for the composition of the fuel blend to be determined from the change in the degree of efficiency $\Delta\eta$ or the parameter, which is a function of it, when the ignition angle ZW is altered and/or from the ignition angle ZW as a function of the degree of efficiency $\eta$ or the parameter, which is a function of the degree of efficiency $\eta$. The method makes it possible to determine the fuel mixing ratio in the fuel tank of internal combustion engines, which can be operated with different fuels.

14 Claims, 1 Drawing Sheet

METHOD FOR DETERMINING THE COMPOSITION OF A FUEL BLEND

TECHNICAL FIELD

The invention relates to a method for determining the composition of a fuel blend from a first and at least a second fuel for operating an internal combustion engine with at least one combustion chamber, wherein fuel blends of different compositions combust at different optimal ignition angles with an optimal degree of efficiency.

BACKGROUND

Internal combustion engines on the basis of Otto (gasoline) engines are generally operated with fuel from hydrocarbons, from fossil fuels based on refined crude oil. Ethanol produced from renewable resources (plants) or another kind of alcohol is increasingly being added in various mixing ratios to the fuel. In the USA and Europe a blend of 75-85% ethanol and 15-25% gasoline is often distributed under the trade name E85. The internal combustion engines are designed in such a way that they can be operated with pure gasoline as well as with blends up to E85. This is denoted as a "flex-fuel operation". The operating parameters in the flex-fuel operation have to be adapted in each case to the existing fuel blend for an efficient operation with only a small discharge of toxic emissions; while at the same time high engine performance is guaranteed. A stoichiometric fuel-air ratio is, for example, present at 14.7 mass parts of air per part of gasoline; however, when using ethanol, a proportion of air of 9 mass parts must be set. Due to the different evaporation characteristics of ethanol and gasoline, different richening factors have to be specified as a function of the mixing ratio during start-up of the internal combustion engine. Knowledge of the prevailing fuel mixing ratio is therefore of fundamental importance for the operation of the internal combustion engine.

A closed-loop control device for a fuel metering system in an internal combustion engine is known from the German patent DE 30 36 107 C3. Said closed-loop control device consists of a fuel supply device (fuel injection valve), a lambda probe, wherewithal (timing element) for generating a base metering signal, which corrects as a function of the operating parameters and ultimately determines the activation signal (ti) of the fuel supply device, a lambda controller, which ascertains a correction factor based on a signal ($\lambda$) measured by the lambda probe, which multiplicatively manipulates the base metering signal (tp) with the correction factor. Provision is thereby made for the lambda correction aside from being a function of the correction factor (KR $\lambda$) to be a function of an additive (KA $\lambda$) and/or a multiplicative (KL $\lambda$) correction variable, which is determined as a function of the correction factor and the operating parameters.

The closed-loop control device makes it possible to compensate for systematic deviations of the fuel meterings specified by the base metering signal, i.e. deviations of the so-called pilot control, from the value, which was ascertained by the closed-loop lambda control, by means of an adaptation intervention with a corresponding long-run correction. Systematic deviations can, for example, be caused by the effects of wear or manufacturing, particularly during the acquisition of the cylinder charge or in the fuel supply system. The quantity of fuel defined by the corrected pilot control corresponds on average to the quantity actually required. Short-term deviations can be compensated for by the lambda controller, which now again accesses the entire control range. The underlying method is also known under the designation of mixture adaptation.

A method for adaptively adjusting a fuel/air mixture to take into account fuel characteristics during the operation of an internal combustion engine is known from the German patent DE 41 17 440 C2. Said internal combustion engine is provided with a lambda controller, which emits a control factor RF, and also with an adaptation integrator, which emits an adaptation factor AF with variable adaptation speed, which in addition to the control factor FR manipulates the adjustment of the fuel/air mixture. Provision is thereby made for a test to be made to determine whether the lambda closed-loop control deviation amplitude exceeds a first threshold value; and if this is the case, the adaptation speed is set to an increased value up until a specified condition is met. Thereafter said adaptation speed is set back to a low value. The underlying method is known as a fuel adaptation.

The fuel adaptation allows for internal combustion engines, which can be operated with different fuel blends, to be operated trouble-free. Hence, the duration of injection must be lengthened by more than 40% when changing from a fuel consisting of pure gasoline to a fuel blend of 85% ethanol and 15% gasoline in order to maintain the same lambda values in the exhaust gas. This stems from the different air requirement for a stoichiometric combustion. According to the method described in the German patent DE 41 17 440 C2, a corresponding adaptation intervention is additionally performed. Because a very pronounced correction of the durations of injection and thereby of the adaptation intervention must be performed in the event of a change in fuel blends in comparison to the effects of wear or manufacturing, the adaptation speed resulting from a detected change in fuel blends is significantly increased in the proposed method.

The mixing ratio of the fuel delivered can be suggested from the adaptation intervention and the duration of injection, which thereby results, respectively from the quantity of fuel supplied to the internal combustion engine. Based on this suggested mixing ratio, the further operating parameters of the internal combustion engine can be adjusted to the prevailing fuel blend.

A disadvantage in the method described is that when a necessary adaptation intervention into the closed-loop lambda control occurs, it cannot always be established with certainty whether the intervention is necessary due to tolerances and drifts on account of wear or due to a change in the mixing ratio, whether the adaptation intervention is then to be executed via the mixture adaptation or via the fuel adaptation. Using differentiation criteria, as, for example, the speed of the change or a fueling detection or a knock tendency, a corresponding assignment can be made with a certain probability; however, a residual uncertainty remains. If the system failed once in distinguishing between the two possibilities, i.e. a change in the fuel mixing ratio was mistakenly interpreted as a tolerance or as a drift on account of wear and was thus compensated for by the mixture adaptation, this error is then afterwards very difficult to detect and correct. With regard to the fuel delivery, it does not matter whether the adaptation is implemented by the mixture adaptation or by the fuel adaptation. When a change in the fuel mixing ratio occurs, further steps besides the adaptation of the quantity of fuel delivered to the internal combustion engine are, however, necessary, for example an adaptation of the ignition angle or a richening of the fuel mixture during starting. These steps are not implemented when the faulty interpretation occurs.

Additional methods are known from the patent literature. Said methods allow for the different characteristics of the fuel being used, among other things due to the different mixing ratios of fossil fuels and alcohols, to be inferred and for a corresponding adaptation of the operating parameters of the internal combustion engine.

A method for optimizing the work cycle of an internal combustion engine with an externally-supplied ignition is known from the German patent DE 29 52 073 A1. In this method, power train data of the internal combustion engine and in fact among other things the current relative angular position of the crankshaft (crank angle) are measured and are provided to an electronic control unit, wherein said data are accordingly allowed to affect the ignition timing and/or the quantity of fuel supplied. In so doing, provision is made for at least one of these control variables to be varied from work cycle to work cycle around an approximate nominal value for the ignition timing and/or the quantity of fuel supplied, for the current indicated pressure or a variable, which analogously changes with it, to be continuously measured in addition to the crank angle, for the average indicated pressure, respectively an analogous variable, to be calculated in each case from said continuous measurements and from the piston position, which is ascertained versus the crank angle, during every power stroke and for the sequentially arranged, calculated values of the average indicated pressure, which are automatically indexed and consecutive values, to be compared with each other. In the process, the variation of the control variable is aborted and the prevailing value of the control variable is retained for each operating state of the internal combustion engine as soon as the average indicated pressure achieves a maximum value.

A device for the acquisition of the fuel characteristics for an internal combustion engine is known from the German patent DE 38 33 123 A1, wherein the quantity of intake air and the air/fuel ratio in the exhaust gas are measured, a base quantity of injected fuel is calculated on the basis of the quantity of intake air and the quantity of the fuel to be injected is controlled in a closed-loop corresponding to the air/fuel ratio. The device is characterized by wherewithal, which acquires pressure, for the acquisition of the internal cylinder pressure, wherewithal, which acquires crank angle, for the acquisition of the crank angle of the internal combustion engine and by a monitoring mechanism, which receives signals from the wherewithal, which acquires pressure, and the wherewithal, which acquires crank angle. Said monitoring mechanism calculates an effective heating value Q of the fuel in an ignition cycle on the basis of the internal cylinder pressure P (θ) at a crank angle in the compression and expansion (combustion) strokes of an ignition cycle, on the basis of the crank angle θ and on the basis of the cylinder capacity V (θ); and said monitoring mechanism ascertains an effective combustion value K or a lower heating value Hu of the fuel. In so doing, the characteristics of the fuel are acquired with the aid of at least the effective combustion value K or the lower heating value Hu or the ratio (Ti/Hu) of the duration Ti of a fuel injection pulse to the heating value Hu.

It is the task of the invention to provide a method, which allows for the determination of the fuel mixing ratio in internal combustion engines, which can be operated with different fuels or fuel blends.

SUMMARY

The task of the invention is thereby solved, in that the ignition angle ZW of the internal combustion engine is altered, in that the degree of efficiency η of the internal combustion engine or a parameter, which is a function of it, is determined as a function of the ignition angle ZW and in that the composition of the fuel blend is determined from the change in the degree of efficiency Δη or in the parameter, which is a function of it, when the ignition angle ZW is altered and/or from the ignition angle ZW as a function of the degree of efficiency η or of the parameter, which is a function of the degree of efficiency η.

The degree of efficiency η of an internal combustion engine is a function of the ignition angle ZW. Starting from an optimal ignition angle $ZW_{max}$ with maximum degree of efficiency $η_{max}$, the degree of efficiency η monotonically decreases when the ignition angle ZW is altered toward an advanced or a retarded ignition point. In the case of a current ignition angle $ZW_{akt}$, the degree of efficiency η changes as a function of the distance of the ignition angle ZW from the optimal ignition angle $ZW_{max}$ for a given alteration of the ignition angle ZW. As a result, the dependence of the degree of efficiency η on the ignition angle ZW is greater with increasing distance of the ignition angle ZW from the optimal ignition angle $ZW_{max}$.

The curve progression of the dependence of the relative degree of efficiency $η_{rel}$, i.e. the current degree of efficiency η, on the ignition angle ZW with respect to the maximum degree of efficiency $η_{max}$ under the respective operating conditions is identical to a very large degree for different fuels and blends from these fuels, for instance from gasoline and ethanol. The curves are simply displaced parallel, i.e. in the direction of more advanced or more retarded ignition points, by the difference of the optimal ignition angles $ZW_{max}$ for the respective fuel, respectively the respective fuel blend. That is why, when starting from a current ignition angle $ZW_{akt}$, the relative degree of efficiency $η_{rel}$ for different fuels, respectively fuel blends, changes for a given alteration of the ignition angle ΔZW with varying degrees of significance because the current ignition angle $ZW_{akt}$ for different fuels and fuel blends is not the same distance away from their optimal ignition angles $ZW_{max}$. Starting from a current ignition angle $ZW_{akt}$, the prevailing fuel, respectively the mixing ratio of the prevailing fuel blend, can therefore be suggested from the change in the relative degree of efficiency $Δη_{rel}$ at a given alteration of the ignition angle ηZW. The current relative degree of efficiency $η_{rel}$ is determined from the current absolute degree of efficiency η.

The method makes it possible to determine the composition of a fuel blend being used from the current operating parameters of the internal combustion engine. Faulty interpretations from previous determinations of the fuel composition do not affect the current result, so that a permanent maladjustment of the system does not take place.

Provision can be made according to a preferred variation of embodiment of the invention for an ignition angle $ZW_{max}$, at which the highest degree of efficiency $η_{max}$ is achieved, to be determined from the height of the change in the degree of efficiency Δη or of a parameter dependent on said change when a specified alteration of the ignition angle ΔZW takes place and for the composition of the fuel blend to be determined from this ignition angle $ZW_{max}$.

Because the curve progression of the dependence of the relative degree of efficiency $η_{rel}$ on the ignition angle ZW is to a very great degree identical for the different fuels and blends from these fuels and is merely displaced parallel to the ignition point, the position of the current ignition angle $ZW_{akt}$ relative to the position of the optimal ignition angle $ZW_{max}$ at the maximum degree of efficiency $η_{max}$ and consequently the position of the optimal ignition angle $ZW_{max}$ can be suggested from the change in the degree of efficiency Δη and as a result from the change in the relative degree of efficiency $Δ_{rel}$ at a given alteration of the ignition angle ΔZW. This optimal ignition angle $ZW_{max}$ can unambiguously be assigned to a fuel or to a fuel mixing ratio.

Provision can be made according to an alternative variation of embodiment of the invention for an ignition angle $ZW_{max}$ to be determined by altering the ignition angle ZW. At said ignition angle $ZW_{max}$, the highest degree of efficiency $\eta_{max}$ is achieved or a parameter, which is a function of the degree of efficiency $\eta$, is optimized. Provision is additionally made for the composition of the fuel blend to be determined from this ignition angle $ZW_{max}$.

The ignition angle is thereby, for instance, altered continuously or in specified stages in the direction, in which an increase in the degree of efficiency $\eta$ or an optimization of the parameter, which is a function of the degree of efficiency $\eta$, occurs. If an alteration in the direction of an advanced as well as a retarded ignition point leads to a worse degree of efficiency $\eta$, the ignition angle $ZW_{max}$ is thus found, at which the highest degree of efficiency $\eta_{max}$ exists. This ignition angle $ZW_{max}$ can unambiguously be assigned to a fuel or a fuel blend of corresponding composition.

The degree of efficiency $\eta$ of an internal combustion engine has a definite connection to the torque produced by the internal combustion engine under the given operating conditions. For that reason, provision can be made for the torque of the internal combustion engine to be used as the parameter, which is a function of the degree of efficiency $\eta$. It is thereby advantageous for the torque of the internal combustion engine to be able to be simply and accurately determined by different methods.

When the motor vehicle is not moving and the clutch is not engaged, the internal combustion engine has to produce at idle an interior torque, which exactly compensates for the so-called drag torque. This is assured by the engine management system with the aid of pilot and closed-loop control algorithms. If the degree of efficiency $\eta$ and consequently the torque of the internal combustion engine change as a result of a deviating composition of the fuel blend, this is then compensated for by an actuating intervention of the idle controller. The intervention of the idle controller and the rate of air flow of the internal combustion engine, which has been affected by the intervention of the idle controller, are thus parameters, which are functions of the degree of efficiency $\eta$ of the internal combustion engine. For that reason, provision can be made for the determination of the composition of the fuel blend to take place at idle of the internal combustion engine and for an actuating variable of a closed-loop idle control and/or of the rate of air flow of the internal combustion engine, which is affected by the closed-loop idle control, to be used as the parameter for the degree of efficiency $\eta$. It is thereby advantageous for the determination of the fuel composition to take place with components, which are present in modern internal combustion engines, using already existing data from the engine management system. In this way the determination of the composition of the fuel blend can be implemented with a corresponding software upgrading of the engine management system.

The torque produced by the internal combustion engine is directly connected to the pressure progression in the combustion chamber. For that reason, provision can be made for the torque of the internal combustion engine to be ascertained with at least one combustion chamber sensor. This variation of embodiment is especially advantageous with internal combustion engines, in which provision is already made for a combustion chamber sensor, for example, to assess the combustion progression. This is the case because an additional function of a software upgrading in the engine management system is simply assigned to said combustion chamber sensor without considerable additional cost.

In the case of internal combustion engines, which are installed in motor vehicles with automatic transmissions, provision can be made for the torque of the internal combustion engine to be ascertained from the torque converter slip of the automatic transmission. In the operation of a transmission with an open torque converter lockup clutch, the torque converter slip produced is an unambiguous function of the turbine rotational speed and the torque supplied by the internal combustion engine. By inverting this relationship, the torque of the internal combustion engine can be determined at a known rotational speed of the internal combustion engine and of the turbine. It is also advantageous with regard to this variation of embodiment in that no additional components are required for determining the torque of the internal combustion engine.

Provision can be made according to a further variation of embodiment of the invention for the torque of the internal combustion engine to be ascertained from the slip of a clutch in a drive train of the internal combustion engine and/or from the time history of the slip of the clutch. For a given friction characteristic curve of a clutch, the torque transferred by a slipping clutch is approximately proportional to the pressure, which is impinged upon the clutch. If the clutch is adjusted in a closed-loop to maintain a constant slip, the torque of the internal combustion engine and thus the degree of efficiency $\eta$ can be suggested from the contact pressure required for this action.

The torque of the internal combustion engine does not progress continuously across the power strokes of the internal combustion engine, but on the contrary intermittently corresponding to the power strokes. For that reason, the angular velocity of the internal combustion engine also oscillates at on average a constant rotational speed with a certain amplitude about an average angular velocity, which is proportional to the engine rotational speed. The height of the amplitude of this rotational discontinuity is smaller at a small torque of the internal combustion engine than at a large torque of the internal combustion engine. The torque of the internal combustion engine can therefore be suggested from the height of the amplitude. Provision can thus be preferably made for the torque of the internal combustion engine to be ascertained from the amplitude of the rotational discontinuity of the internal combustion engine. It is also advantageous with regard to this variation of embodiment of the invention in that wherewithal for determining the angular velocity is generally already present in modern internal combustion engines, so that no additional components are required to determine the torque of the internal combustion engine.

The determination of the fuel mixing ratio results from the knowledge of the dependence of the degree of efficiency $\eta$ on the ignition angle ZW for different fuel blends. The degree of efficiency is likewise a function of the fuel/air ratio of the mixture supplied to the internal combustion engine. A reproducible assignment of a change in the degree of efficiency $\eta$, caused by an alteration of the ignition angle $\Delta ZW$, to a fuel mixing ratio can thereby be achieved, in that the composition of the fuel blend is determined at a stoichiometric fuel/air ratio.

Provision can be made according to a preferred form of embodiment of the invention for the torque of the internal combustion engine to be held constant when altering the ignition angle. For this purpose, the rate of air flow and the fuel delivery can be controlled in a closed-loop in such a way, that the torque $\eta$ of the internal combustion engine is held at least approximately constant when an alteration of the ignition angle ΔZW is performed. The necessary change in the rate of air flow for this to occur is a measurement for the change in torque and consequently the change in the degree of efficiency Δη of the internal combustion engine. The adjustment by the closed-loop control to a constant torque has the advantage, in that no change in the performance as a result of the variation of the ignition timing is outwardly apparent to the operator of the internal combustion engine, for example in an application in a motor vehicle. If the optimal ignition angle $ZW_{max}$ is determined by continuous or recurrent alteration of the ignition angle ZW, the optimal ignition angle $ZW_{max}$ is then achieved, when the rate of air flow has taken on the lowest value at a constant torque.

If provision is made for the fuel mixing ratio, which was ascertained, to be compared with a fuel mixing ratio, which was determined by a fuel type sensor and/or in a fuel adaptation and for a malfunction to be suggested if the difference between the fuel mixing ratios, which were determined, exceeds a specified threshold value, the fuel mixing ratio, which was ascertained with the aid of the fuel type sensor or the fuel adaptation, can thus be monitored within the scope of a plausibility consideration. A faulty adaptation of a mixture error can thus be reversed.

The method is preferably employed for determining the composition of a gas/ethanol fuel blend and/or a gas/methanol fuel blend and/or a gas/ethanol/methanol fuel blend. All of these fuels and fuel blends display a maximum degree of efficiency $\eta_{max}$ at different optimal ignition angles $ZW_{max}$, so that an unambiguous assignment of the fuel, respectively the fuel blend, is possible via the method described.

The method can furthermore be used for determining the composition of a gasoline/gas-fuel blend. With regard to internal combustion engines, which, for example, can alternatively be operated with gasoline and with natural gas, two fuel supply systems are present. A continuous blending and mixing between the two kinds of fuel can take place via an injection valve, which is correspondingly adapted. The injection valve has in this instance two separate inlet ports for the two kinds of fuel but only one outlet into the intake manifold, respectively the combustion chamber of the internal combustion engine. The metering of the two kinds of fuel takes place via the injection valve based on the control parameters of the engine management system. In the case of an error, for instance in the case of a defective sealing ring, the fuel metering can have a deviation vis-à-vis the values specified by the control parameters. In this way, an unintended, constant blending of natural gas can take place during a gasoline operation. This leads to a displacement of the progression of the degree of efficiency η as a function of the ignition angle ZW, so that the error can be proven with the aid of the method described.

BRIEF DESCRIPTION OF THE DRAWINGS

The invention is described below in detail using the examples of embodiment depicted in the figures. The following are shown.

DETAILED DESCRIPTION

Figure 1:
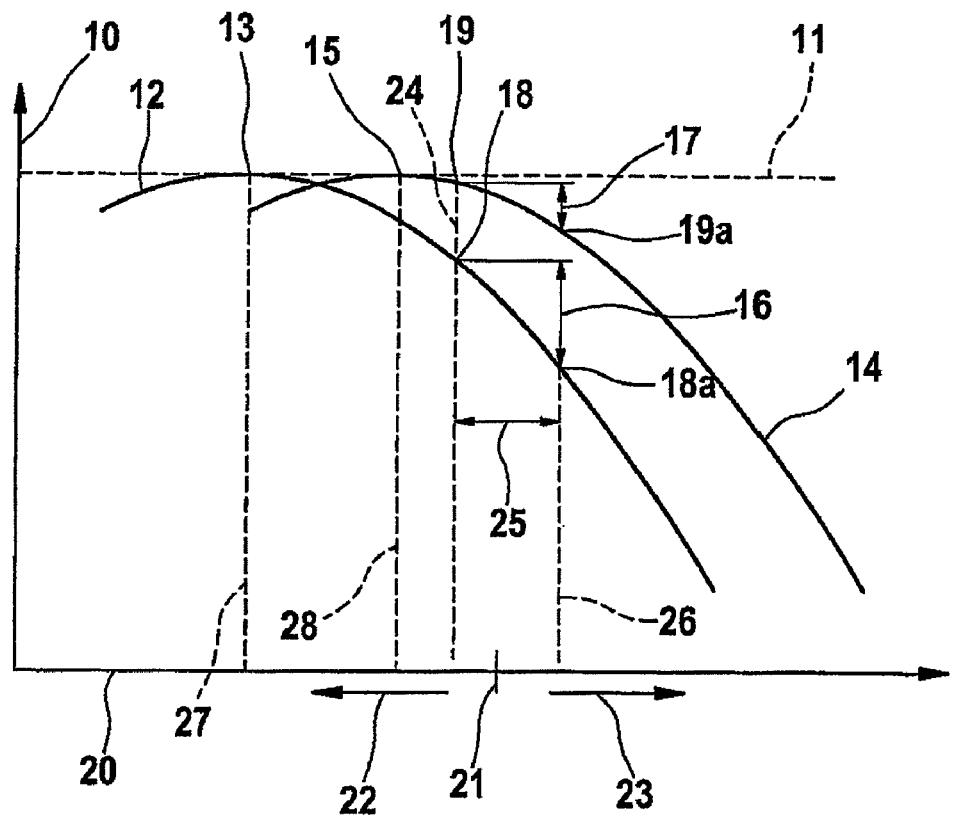
FIG. 1 depicts the relative degree of efficiency $\eta_{rel}$ as a function of the ignition angle ZW for different fuels.

FIG. 1 shows in graphic depiction the relative degree of efficiency $\eta_{rel}$ as a function of the ignition angle ZW for different fuels. For this purpose, the relative degree of efficiency $\eta_{rel}$ is plotted on a first ordinate 10 versus the ignition angle ZW depicted on a first abscissa 20.

In a degree of efficiency progression for ethanol 12, the relative degree of efficiency $\eta_{rel}$ is shown as a function of the ignition angle ZW during operation of the internal combustion engine with ethanol; while a degree of efficiency progression for gasoline 14 shows the same dependence for gasoline as fuel. A 100% mark 11, which is plotted on the first ordinate 10, shows the maximum relative degree of efficiency $\eta_{rel}$ of 100%.

The degree of efficiency progression for ethanol 12 achieves the maximum relative degree of efficiency $\eta_{max}$ for ethanol 13 of 100% at an optimal ignition angle $ZW_{max}$ for ethanol 27; while the degree of efficiency progression for gasoline 14 achieves the maximum relative degree of efficiency $\eta_{max}$ for gasoline 15 at an optimal ignition angle $ZW_{max}$ for gasoline 28.

The direction of an advancing of the ignition angle ZW is shown with a first arrow 22, which departs from top dead center (TDC) OT 21 of the internal combustion engine; while a second arrow 23 points in the direction of retardation.

A current ignition angle $ZW_{akt}$ 24 is specified for describing the method according to the invention. A current relative degree of efficiency $\eta_{rel}$ for ethanol 18 of the internal combustion engine results during an ethanol operation at this current ignition angle $ZW_{akt}$ 24; while in a gasoline operation, a current relative degree of efficiency $\eta_{rel}$ for gasoline 19 results. An alteration of the ignition angle ΔZW 25, depicted by an arrow, leads to a new ignition angle $ZW_{neu}$ 26. The relative degree of efficiency $\eta_{rel}$ during an operation with ethanol changes from the current relative degree of efficiency $\eta_{akt}$ for ethanol 18 by Δη for ethanol 16 to a new relative degree of efficiency $\eta_{neu}$ for ethanol 18a at this new ignition angle $ZW_{neu}$ 26. The relative degree of efficiency during an operation with gasoline changes from the current relative degree of efficiency $\eta_{akt}$ for gasoline 19 by Δη for gasoline 17 to a new relative degree of efficiency $\eta_{neu}$ for gasoline 19a.

The degree of efficiency progression for ethanol 12 essentially corresponds in its curve shape to the degree of efficiency progression for gasoline 14, the curves being displaced towards one another by the amount of the ignition angle distance between the optimal ignition angle $ZW_{max}$ for gasoline 28 and the optimal ignition angle $ZW_{max}$ for ethanol 27.

The current ignition angle $ZW_{akt}$ lies closer to the optimal ignition angle $ZW_{max}$ for gasoline 28 than to the optimal ignition angle $ZW_{max}$ for ethanol 27. The current relative degree of efficiency $\eta_{rel}$ for ethanol 18 is consequently situated in a steeper region of the associated degree of efficiency progression for ethanol 12 than the current relative degree of efficiency $\eta_{rel}$ for gasoline 19. An alteration of the ignition angle ΔZW 25, which emanates from the current ignition angle $ZW_{akt}$, leads during an operation with ethanol to a greater change in the relative degree of efficiency Δη for ethanol 16 than during an operation with gasoline with a change of the relative degree of efficiency Δη for gasoline 17.

Because the progression of the relative degree of efficiency $\eta_{rel}$ 12, 14 as a function of the ignition angle ZW is known and is identical in the curve shape for different fuels, the distance of the current ignition angle $ZW_{akt}$ 24 from the optimal ignition angle $ZW_{max}$ 27, 28 and therefore the optimal ignition angle $ZW_{max}$ 27, 28 can be calculated from the change in the relative degree of efficiency $\Delta\eta_{rel}$ 16, 17 as a result of a specified alteration of the ignition angle ΔZW 25, emanating from a current ignition angle $ZW_{akt}$ 24. This optimal ignition angle $ZW_{max}$ 27, 28 can unambiguously be assigned to a fuel, which in the example of embodiment at hand is either ethanol or gasoline.

Fuel blends from ethanol and gasoline display optimal ignition angles $ZW_{max}$, which lie between the optimal ignition angle $ZW_{max}$ for ethanol and the optimal ignition angle $ZW_{max}$ for gasoline; and in so doing, an increasing percentage of a fuel in the blend displaces the ignition angle in the direction of the respective pure fuel. In so doing, the curve shape of the degree of efficiency progression remains in tact. If the optimal ignition angle $ZW_{max}$ is determined according to the method described, the mixing ratio between the two fuels can be determined on the basis of this optimal ignition angle $ZW_{max}$.

According to a variation of embodiment of the invention, the optimal ignition angle $ZW_{max}$ can also be thereby ascertained, in that the ignition angle ZW is adjusted continuously or in stages in the direction of increasing degrees of efficiency $\eta$. If the optimal ignition angle $ZW_{max}$ is achieved, advancing as well as retardation of the ignition timing leads to a decrease in the degree of efficiency.

Beside the direct determination and evaluation of the degree of efficiency $\eta$ of the internal combustion engine, parameters, which are a function of the degree of efficiency $\eta$, can also be evaluated. Hence, the torque of the internal combustion engine is directly a function of the degree of efficiency $\eta$ of the internal combustion engine and can be used in determining the optimal ignition angle $ZW_{max}$. The task of determining the fuel composition is thus reduced to the evaluation of a change in torque when ignition angle interventions are performed.

A simple evaluation is possible when the internal combustion engine is idling. If an ignition angle intervention is performed at idle, the torque of the internal combustion engine thus changes. Because a closed control loop is active at idle, the idle closed-loop control makes sure that the reduction in torque as a result of the ignition angle adjustment is compensated for by an increase in the quantity of air supplied to the internal combustion engine. That is why the torque actually remains the same in the steady state operation, but the quantity of air supplied changes. The percentage change in the quantity of air supplied is thus inversely proportional to the percentage change in the degree of efficiency $\eta$. Because the quantity of air is known in the control electronics of the internal combustion engine, the optimal ignition angle $ZW_{max}$ 27, 28 can be suggested from the change in the quantity of air supplied.

Figure 2:
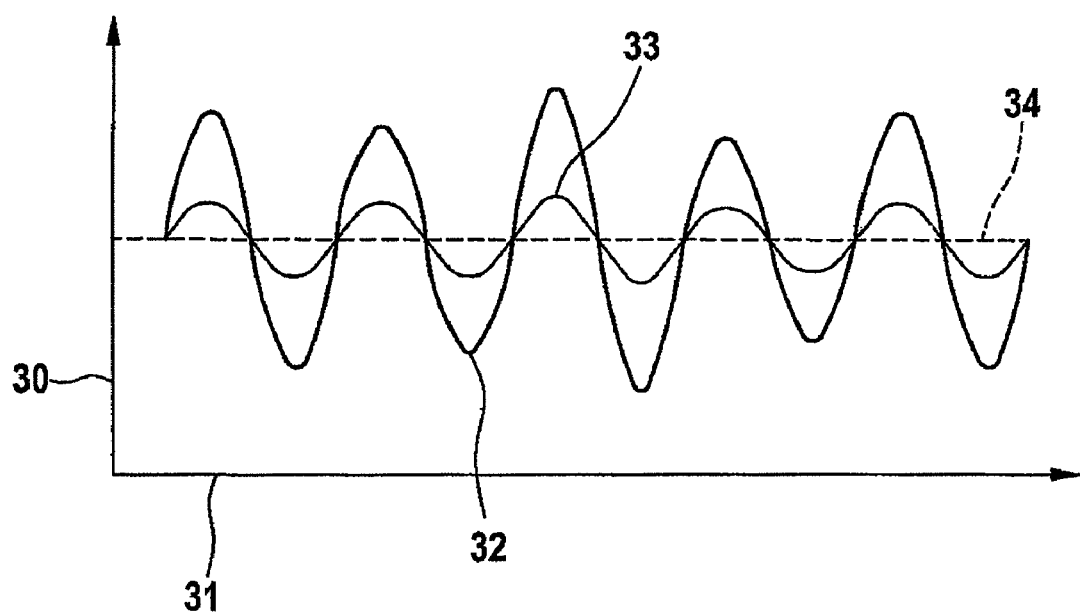
FIG. 2 depicts the rotational discontinuity of an internal combustion engine.

FIG. 2 shows in graphic depiction the rotational discontinuity of an internal combustion engine, which displays this at an otherwise constant average rotational speed.

On a second ordinate 30, the angular velocity of the internal combustion engine is plotted versus a time axis 31. A first curve 32 shows the time history of the angular velocity of the internal combustion engine at a high torque; whereas a second curve 33 indicates the angular velocity at a low torque. Both curves 32, 33 oscillate with varying amplitude about an average angular velocity 34 proportionally to the average rotational speed of the internal combustion engine.

In the case of internal combustion engines, the torque is not continuously produced, but on the contrary intermittently corresponding to the power strokes of the cylinders. That is why an internal combustion engine also does not rotate at an on average constant rotational speed with an absolutely constant angular velocity. The angular velocity oscillates with a certain amplitude about the average angular velocity 34. The amplitude is smaller at smaller torques of the internal combustion engine than at larger torques.

The optimal ignition angle $ZW_{max}$ with maximum degree of efficiency $\eta_{max}$ can thereby be found, in that the ignition angle is adjusted continuously or in stages in the direction of increasing amplitude of the rotational discontinuity up until said discontinuity assumes a maximum value. The composition of the fuel blend can then be suggested from the optimal ignition angle $ZW_{max}$, which was ascertained in the aforementioned manner.

In a modification of the implementation of the method described, the optimal ignition angle $ZW_{max}$ can be determined without a noticeable change in the torque of the internal combustion engine. For this purpose, the quantity of air supplied to the internal combustion engine is varied simultaneously with an alteration of the ignition angle ZW in such a way, that the amplitude of the rotational discontinuity remains at least approximately the same. This can be achieved by means of a control loop, which adjusts to a constant amplitude of the rotational discontinuity. An even amplitude of the rotational discontinuity means an even torque. The optimal ignition angle $ZW_{max}$ with a maximum degree of efficiency $\eta_{max}$ is then achieved, when the required quantity of air to maintain the amplitude of the rotational discontinuity and consequently the torque assumes its smallest value as a function of the ignition angle ZW.

The invention claimed is:

1. A method of determining the composition of a fuel blend from a first fuel and at least a second fuel to operate an internal combustion engine having at least one combustion chamber, wherein fuel blends of different composition combust at different optimal ignition angles with an optimal degree of efficiency, the method comprising:
    varying an ignition angle; and
    determining a degree of efficiency of the internal combustion and a parameter that is a function of the degree efficiency of the internal combustion as a function of the varied ignition angle;
    wherein the composition of the fuel blend is determined from at least one of:
        a change in the degree of efficiency of the internal combustion when the ignition angle is varied;
        a change in the parameter that is a function of the degree efficiency of the internal combustion when the ignition angle is varied;
        the ignition angle as a function of the degree of efficiency of the internal combustion; and
        the parameter that is a function of the degree efficiency of the internal combustion.

2. A method according to claim 1, further comprising determining an ignition angle that has a highest degree of efficiency from a magnitude of the change in the parameter that is a function of the degree efficiency of the internal combustion change when a specified variation of the ignition angle is performed, wherein the composition of the fuel blend is determined from the determined ignition angle.

3. A method according to claim 1, further comprising determining the composition of the fuel blend from at least one of:
    an ignition angle that a highest degree of efficiency; and
    an ignition angle that has an optimized parameter that is a function of the degree efficiency.

4. A method according to claim 1, wherein a torque of the internal combustion engine is used as the parameter that is a function of the degree of efficiency of the internal combustion engine.

5. A method according to claim 1, further comprising determining the composition of the fuel blend when the internal combustion engine is in an idling state, and wherein an actuating variable comprising a closed-loop idle control and/or a rate of air flow, that is affected by the closed-loop idle control, are used as the parameter for the degree of efficiency of the internal combustion engine.

6. A method according to claim 4, further comprising ascertaining the torque of the internal combustion engine with at least one combustion chamber pressure sensor.

7. A method according to claim 4, further comprising ascertaining the torque of the internal combustion engine from a torque converter slip of an automatic transmission.

8. A method according to claim 4, further comprising ascertaining the torque of the internal combustion engine from at least one of:
- a slip of a clutch in a drive train of the internal combustion engine; and
- a time history of the slip of the clutch.

9. A method according to claim 4, further comprising ascertaining the torque of the internal combustion engine from an amplitude of a rotational discontinuity of the internal combustion engine.

10. A method according to claim 1, further comprising determining the composition of the fuel blend at a stoichiometric fuel/air ratio.

11. A method according to claim 1, further comprising holding a torque of the internal combustion engine constant when varying the ignition angle.

12. A method according to claim 1, further comprising comparing an ascertained fuel mixing ratio with a fuel mixing ratio determined by a fuel type sensor or in a fuel adaptation, wherein a malfunction is suggested if a calculated difference between the fuel mixing ratios exceeds a specified threshold value.

13. A method according to claim 1, wherein the fuel blend is one of:
- a gasoline/ethanol fuel blend;
- a gasoline/methanol fuel blend; and
- a gasoline/ethanol/methanol fuel blend.

14. A method according to claim 1, wherein the fuel blend is a gasoline/gas fuel blend.

\* \* \* \* \*